(12) United States Patent
Ito

(10) Patent No.: US 8,804,216 B2
(45) Date of Patent: Aug. 12, 2014

(54) IMAGE READING DEVICE AND IMAGE FORMING APPARATUS

(75) Inventor: Masao Ito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 20 days.

(21) Appl. No.: 13/604,293

(22) Filed: Sep. 5, 2012

(65) Prior Publication Data
US 2013/0258427 A1    Oct. 3, 2013

(30) Foreign Application Priority Data

Mar. 29, 2012   (JP) .................................. 2012-075440

(51) Int. Cl.
*H04N 1/46*    (2006.01)
(52) U.S. Cl.
USPC ........... 358/505; 358/475; 358/509; 358/501; 382/275; 356/417
(58) Field of Classification Search
CPC .............. C12Q 1/6827; C12Q 1/6816; C12Q 2537/165; H04N 2201/0094
USPC ......... 358/474, 475, 509, 505, 501, 513, 514, 358/1.9, 488; 356/419, 416, 417; 382/275, 382/168
See application file for complete search history.

(56) References Cited

U.S. PATENT DOCUMENTS

| | | | | |
|---|---|---|---|---|
| 4,782,390 A | * | 11/1988 | Hayashi et al. | 358/506 |
| 5,596,928 A | * | 1/1997 | Marmin et al. | 101/378 |
| 6,219,158 B1 | * | 4/2001 | Dawe | 358/509 |
| 6,747,766 B1 | * | 6/2004 | Kamisuwa et al. | 358/505 |
| 6,992,779 B2 | * | 1/2006 | Ueki | 356/512 |
| 7,142,335 B2 | * | 11/2006 | Tesavis | 358/474 |
| 7,652,805 B2 | * | 1/2010 | Oguri et al. | 358/482 |
| 7,791,755 B2 | * | 9/2010 | Mori | 358/1.18 |
| 7,940,323 B2 | * | 5/2011 | Takanashi | 348/345 |
| 8,031,381 B2 | * | 10/2011 | Yotsuyanagi | 358/505 |

(Continued)

FOREIGN PATENT DOCUMENTS

| | | |
|---|---|---|
| JP | 01179139 A | 7/1989 |
| JP | 2001203866 A | 7/2001 |

(Continued)

OTHER PUBLICATIONS

Japanese Office Action issued Feb. 5, 2013 in corresponding Japanese Patent Application 2012-075440.

(Continued)

*Primary Examiner* — Negussie Worku
(74) *Attorney, Agent, or Firm* — Sughrue Mion, PLLC

(57) ABSTRACT

An image reading device includes a first reader member, an optical system, and a second reader member. The first reader member reads an image recorded on a surface of a medium traveling through a predetermined read area by receiving light from the medium. The read area is set on a transport path along which the medium is transported. The optical system guides the light from the medium to the first reader member. The second reader member has a color measurement unit disposed on an optical path of the light guided by the optical system and performing color measurement on the light. The second reader member reads a color of the image recorded on the surface of the medium on the basis of the light. The second reader member reads a color of an image in a predetermined second area included in the read area read by the first reader member.

13 Claims, 9 Drawing Sheets

(56) References Cited

U.S. PATENT DOCUMENTS

| | | | |
|---|---|---|---|
| 8,120,809 B2* | 2/2012 | Mori | 358/1.18 |
| 8,294,947 B2* | 10/2012 | Yanagi | 358/1.9 |
| 8,305,662 B2* | 11/2012 | Oosaki | 358/505 |
| 8,422,098 B2* | 4/2013 | Hamada et al. | 358/498 |
| 8,502,980 B2* | 8/2013 | Imura | 356/402 |
| 2003/0063332 A1* | 4/2003 | Sato | 358/474 |
| 2004/0184104 A1* | 9/2004 | Yamamoto et al. | 358/2.1 |
| 2010/0247148 A1* | 9/2010 | Haruyama et al. | 399/159 |

FOREIGN PATENT DOCUMENTS

| | | |
|---|---|---|
| JP | 2003-8828 A | 1/2003 |
| JP | 2003008828 A | 1/2003 |
| JP | 2005-167725 A | 6/2005 |
| JP | 2005-295359 A | 10/2005 |

OTHER PUBLICATIONS

Australian Office Action issued Feb. 15, 2013 in corresponding Australian Patent Application No. 2012232980.

* cited by examiner

— COLOR MEASUREMENT
······ CCD

— COLOR MEASUREMENT
······ CCD

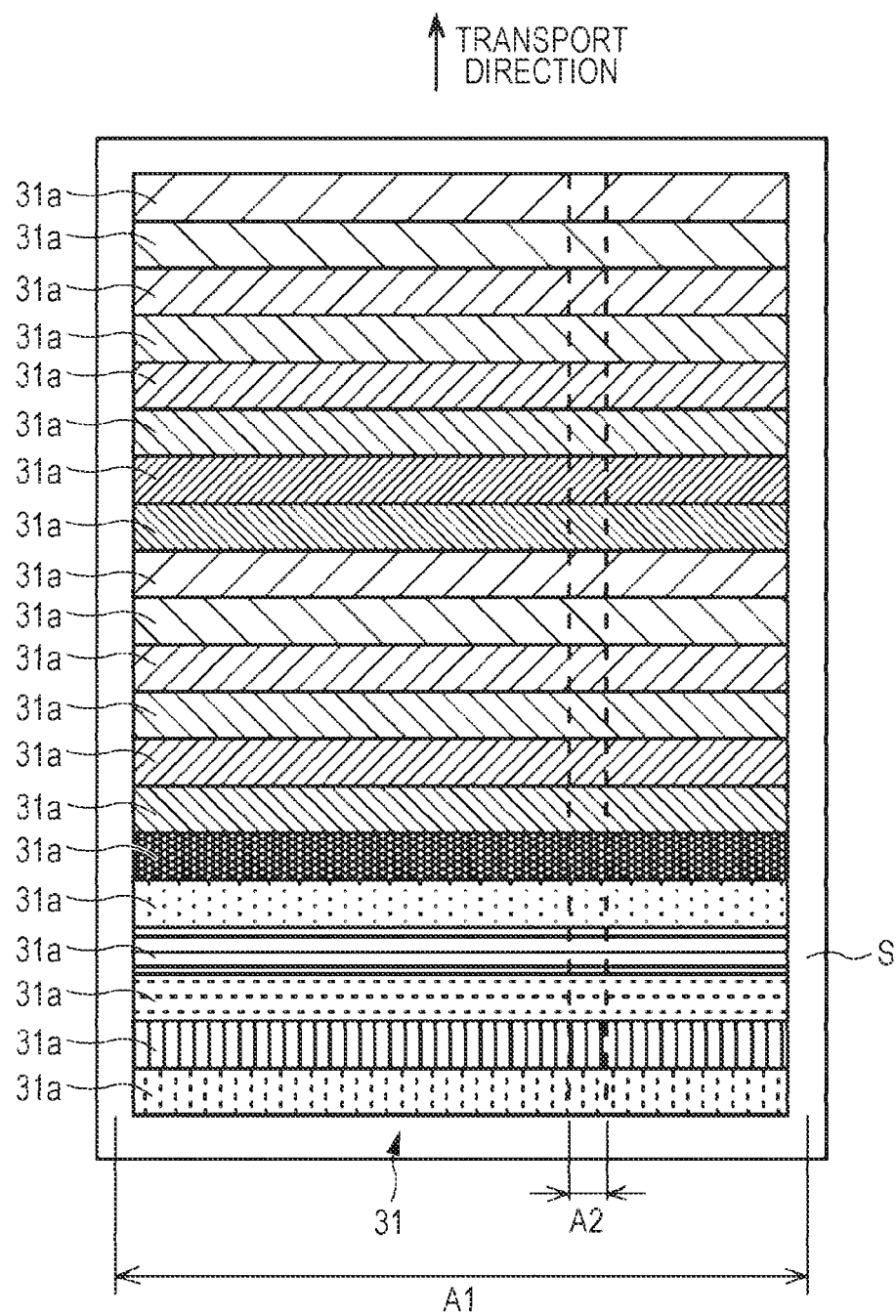

IMAGE READING DEVICE AND IMAGE FORMING APPARATUS

CROSS-REFERENCE TO RELATED APPLICATIONS

This application is based on and claims priority under 35 USC 119 from Japanese Patent Application No. 2012-075440 filed Mar. 29, 2012.

BACKGROUND

Technical Field

The present invention relates to image reading devices and image forming apparatuses.

SUMMARY

According to an aspect of the invention, there is provided an image reading device including a first reader member, an optical system, and a second reader member. The first reader member reads an image recorded on a surface of a medium traveling through a predetermined read area by receiving light from the medium. The read area is set on a transport path along which the medium is transported. The optical system guides the light from the medium to the first reader member. The second reader member has a color measurement unit disposed on an optical path of the light guided by the optical system and performing color measurement on the light. The second reader member reads a color of the image recorded on the surface of the medium on the basis of the light. The second reader member reads a color of an image in a predetermined second area included in the read area read by the first reader member.

BRIEF DESCRIPTION OF THE DRAWINGS

An exemplary embodiment of the present invention will be described in detail based on the following figures, wherein:

FIG. 9 illustrates a chart image used for adjustment in the image forming apparatus according to the first exemplary embodiment.

DETAILED DESCRIPTION

Figure 1:
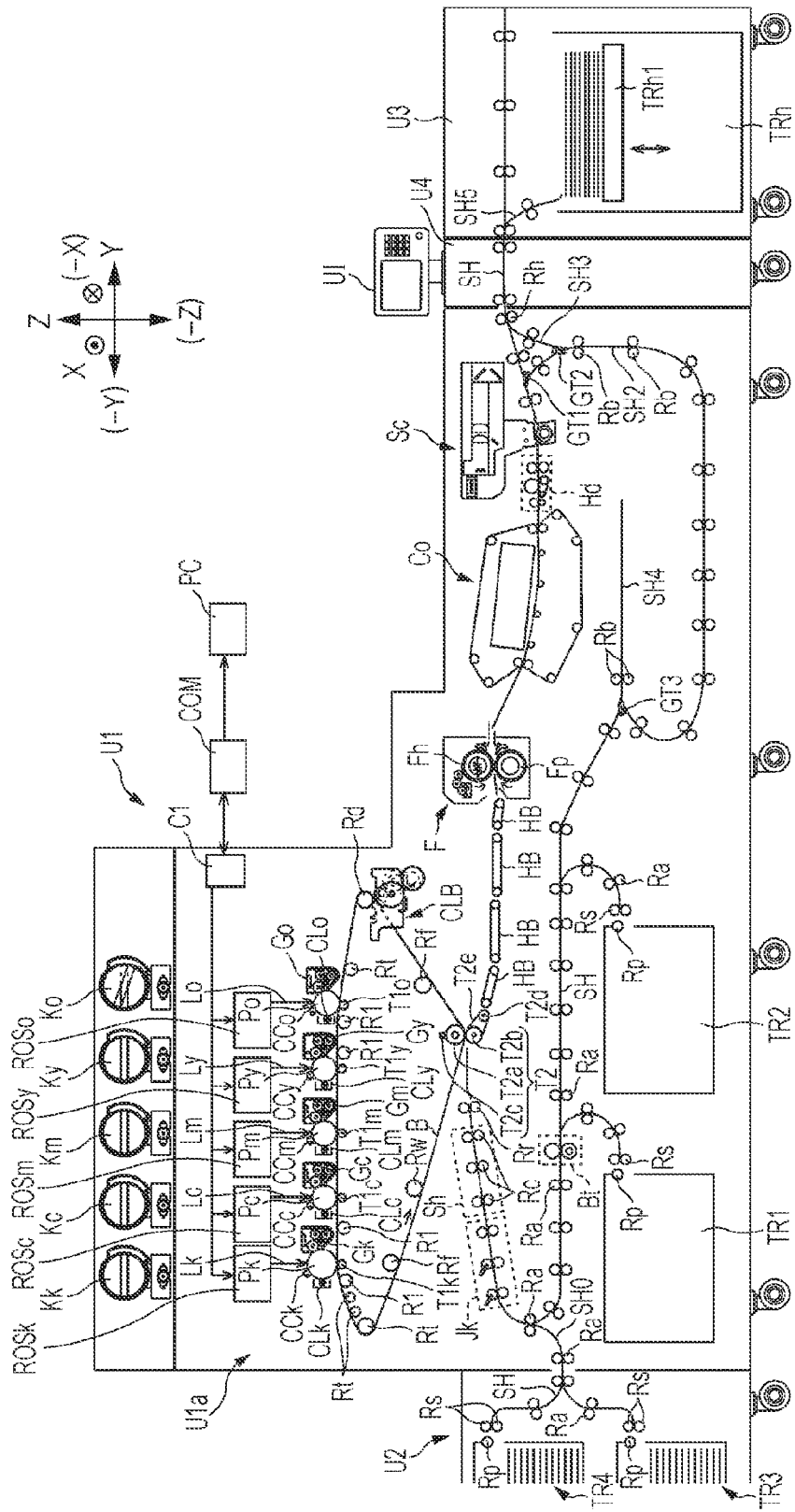
FIG. 1 is an overall view of an image forming apparatus according to a first exemplary embodiment of the present invention.

Although an exemplary embodiment of the present invention will be described in detail below with reference to the drawings, the present invention is not to be limited to the following exemplary embodiment.

In order to provide an easier understanding of the following description, the front-rear direction will be defined as "X-axis direction" in the drawings, the left-right direction will be defined as "Y-axis direction", and the up-down direction will be defined as "Z-axis direction". Moreover, the directions or the sides indicated by arrows X, −X, Y, −Y, Z, and −Z are defined as forward, rearward, rightward, leftward, upward, and downward directions, respectively, or as front, rear, right, left, upper, and lower sides, respectively.

Furthermore, in each of the drawings, a circle with a dot in the center indicates an arrow extending from the far side toward the near side of the plane of the drawing, and a circle with an "x" therein indicates an arrow extending from the near side toward the far side of the plane of the drawing.

In the drawings used for explaining the following description, components other than those for providing an easier understanding of the description are omitted where appropriate.

First Exemplary Embodiment

Overall Configuration of Printer U According to First Exemplary Embodiment

FIG. 1 is an overall view of an image forming apparatus according to a first exemplary embodiment of the present invention.

Figure 2:
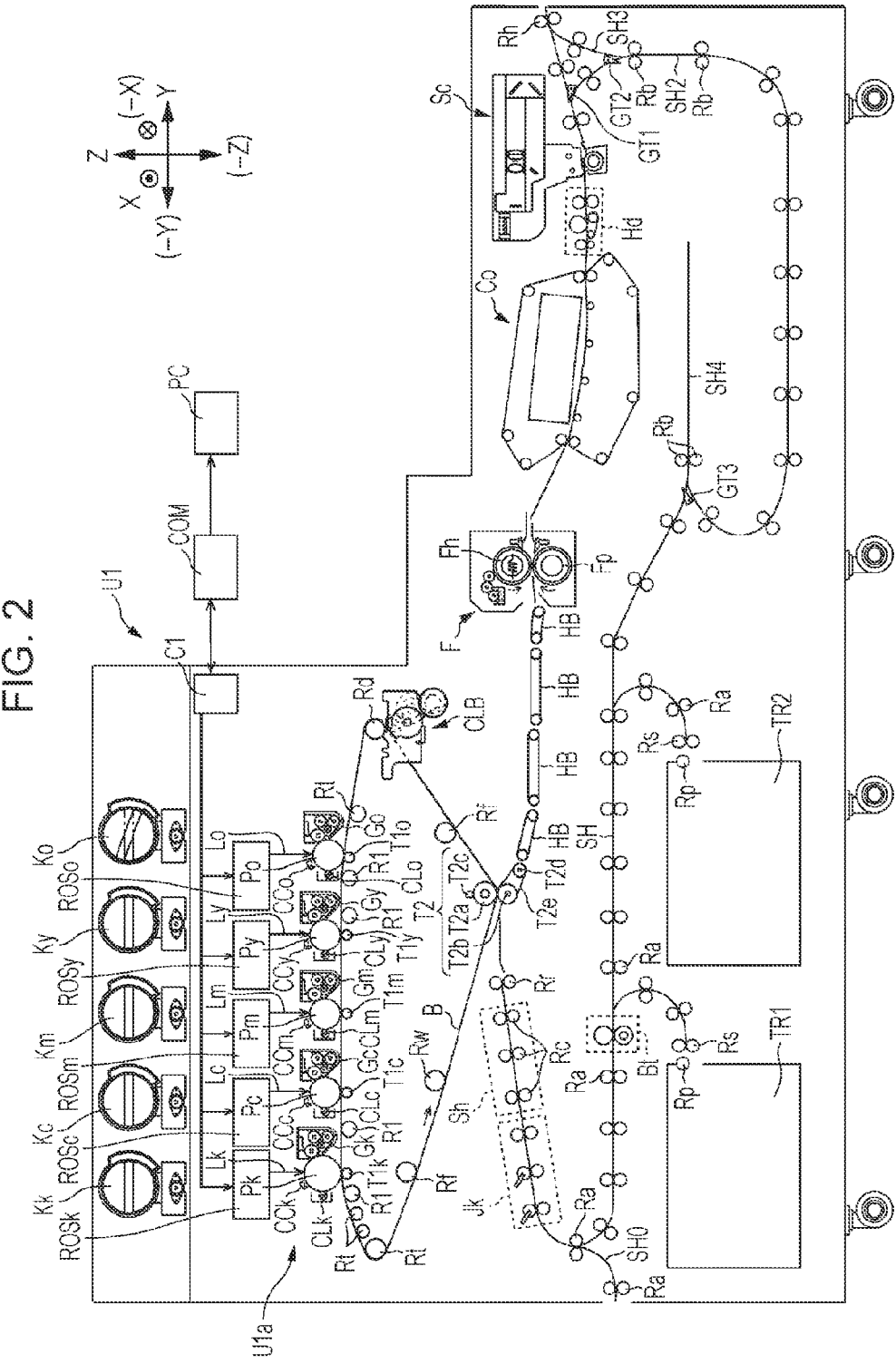
FIG. 2 illustrates a relevant part of the image forming apparatus according to the first exemplary embodiment of the present invention.

FIG. 2 illustrates a relevant part of the image forming apparatus according to the first exemplary embodiment of the present invention.

Referring to FIGS. 1 and 2, a printer U as an example of an image forming apparatus according to the first exemplary embodiment includes an image forming apparatus body U1, a feeder unit U2 as an example of a feeding device that feeds a medium to the image forming apparatus body U1, an output unit U3 as an example of an output device to which a medium having an image recorded thereon is output, an interface module U4 as an example of a connector that connects the body U1 and the output unit U3, and an operable unit U1 operable by a user.

Configuration of Marking Unit in First Exemplary Embodiment

Referring to FIGS. 1 and 2, the image forming apparatus body U1 includes a controller C1 that controls the printer U, a communicator (not shown) that receives image information transmitted from a print image server COM as an example of an information transmitter externally connected to the printer U via a dedicated cable (not shown), and a marking unit U1$a$ as an example of an image recorder that records an image onto a medium. The print image server COM is connected, via a line such as a cable or a local area network (LAN), to a personal computer PC as an example of an image transmitter that transmits information of an image to be printed in the printer U.

The marking unit U1a includes photoconductor drums Py, Pm, Pc, and Pk as an example of image bearing members for yellow (Y), magenta (M), cyan (C), and black (K) colors, and a photoconductor drum Po for giving glossiness to an image if the image to be printed is a photographic image or the like. The photoconductor drums Py to Po have photoconductive dielectric surfaces.

Referring to FIGS. 1 and 2, in the rotational direction of the photoconductor drum Pk for the black color, a charger CCk, an exposure unit ROSk as an example of a latent-image forming unit, a developing unit Gk, a first-transfer roller T1k as an example of a first-transfer unit, and a photoconductor cleaner CLk as an example of an image-bearing-member cleaner are arranged around the photoconductor drum Pk.

Likewise, chargers CCy, CCm, CCc, and CCo, exposure units ROSy, ROSm, ROSc, and ROSo, developing units Gy, Gm, Gc, and Go, first-transfer rollers T1y, Tim, T1c, and T1o, and photoconductor cleaners CLy, CLm, CLc, and CLo are respectively arranged around the remaining photoconductor drums Py, Pm, Pc, and Po.

Toner cartridges Ky, Km, Kc, Kk, and Ko as an example of containers that accommodate therein developers to be supplied to the developing units Gy to Go are detachably supported above the marking unit U1a.

An intermediate transfer belt B as an example of an intermediate transfer body is disposed below the photoconductor drums Py to Po. The intermediate transfer belt B is interposed between the photoconductor drums Py to Po and the first-transfer rollers T1y to T1o. The undersurface of the intermediate transfer belt B is supported by a drive roller Rd as an example of a drive member, a tension roller Rt as an example of a tension applying member, a working roller Rw as an example of a meander prevention member, multiple idler rollers Rf as an example of driven members, a backup roller T2a as an example of a second-transfer opposing member, multiple retracting rollers R1 as an example of movable members, and the aforementioned first-transfer rollers T1y to T1o.

A belt cleaner CLB as an example of an intermediate-transfer-body cleaner is disposed on the top surface of the intermediate transfer belt B near the drive roller Rd.

A second-transfer roller T2b as an example of a second-transfer member is disposed facing the backup roller T2a with the intermediate transfer belt B interposed therebetween. The backup roller T2a is in contact with a contact roller T2c as an example of a contact member for applying a voltage having a reversed polarity relative to the charge polarity of the developers to the backup roller T2a. In the first exemplary embodiment, a transport belt T2e as an example of a transport member is bridged between the second-transfer roller T2b and a drive roller T2d as an example of a drive member disposed at the lower right side thereof.

The backup roller T2a, the second-transfer roller T2b, and the contact roller T2c constitute a second-transfer unit T2 according to the first exemplary embodiment. The first-transfer rollers T1y to T1o, the intermediate transfer belt B, the second-transfer unit T2, and the like constitute a transfer device T1+B+T2 according to the first exemplary embodiment.

Feed trays TR1 and TR2 as an example of containers that accommodate therein recording sheets S as an example of media are provided below the second-transfer unit T2. A pickup roller Rp as an example of a fetching member and a separating roller Rs as an example of a separating member are disposed at the upper right side of each of the feed trays TR1 and TR2. A transport path SH that transports each recording sheet S extends from the separating roller Rs. Multiple transport rollers Ra as an example of transport members that transport each recording sheet S downstream are arranged along the transport path SH.

A deburring unit Bt as an example of an unwanted-part remover is disposed at the downstream side, in the transport direction of each recording sheet S, of a merging point of the transport paths SH from the two feed trays TR1 and TR2. Specifically, the deburring unit Bt performs so-called deburring by transporting each recording sheet S downstream while nipping the recording sheet S with a predetermined pressure so as to remove an unwanted part from an edge of the recording sheet S.

A multi-feed detector Jk is disposed at the downstream side of the deburring unit Bt and detects whether a stack of multiple recording sheets S are multi-fed by measuring the thickness of the recording sheet or sheets S traveling therethrough. Correcting rollers Rc as an example of an orientation correcting unit that corrects a so-called skew, i.e., inclination, of each recording sheet S relative to the transport direction thereof are disposed at the downstream side of the multi-feed detector Jk. A registration roller Rr as an example of an adjusting member that adjusts the timing for transporting each recording sheet S toward the second-transfer unit T2 is disposed at the downstream side of the correcting rollers Rc.

The feeder unit U2 is similarly provided with components, such as feed trays TR3 and TR4, which have configurations similar to those of the feed trays TR1 and TR2, the pickup rollers Rp, the separating rollers Rs, and the transport rollers Ra. A transport path SH from the feed trays TR3 and TR4 merges with the transport path SH in the image forming apparatus body U1 at the upstream side of the multi-feed detector Jk.

Multiple transport belts HB that support each recording sheet S on the surfaces thereof so as to transport the recording sheet S downstream are arranged at the downstream side of the transport belt T2e in the transport direction of the recording sheet S.

A fixing device F is disposed at the downstream side of the transport belts HB in the transport direction of the recording sheet S.

A cooling device Co that cools the recording sheet S is disposed at the downstream side of the fixing device F.

A decurler Hd as an example of a bent-medium corrector that corrects a so-called curl, i.e., bending, of the recording sheet S by applying pressure to the recording sheet S is disposed at the downstream side of the cooling device Co.

An image reading device Sc that reads an image recorded on the recording sheet S is disposed at the downstream side of the decurler Hd.

An inversion path SH2 as an example of a transport path that diverges from the transport path SH extending toward the interface module U4 is formed at the downstream side of the image reading device Sc. A first gate GT1 as an example of a transport-direction switching member is disposed at the diverging point of the inversion path SH2.

Multiple switchback rollers Rb as an example of transport members that are rotatable in forward and reverse directions are arranged along the inversion path SH2. A connection path SH3 as an example of a transport path that diverges from an upstream section of the inversion path SH2 and merges with the transport path SH at the downstream side of the diverging point of the inversion path SH2 is formed at the upstream side of the switchback rollers Rb. A second gate GT2 as an example of a transport-direction switching member is disposed at the diverging point between the inversion path SH2 and the connection path SH3.

At the downstream side of the inversion path SH2, a switchback path SH4 for performing so-called switchback by reversing the transport direction of the recording sheet S is disposed below the cooling device Co. A switchback roller Rb as an example of a transport member that is rotatable in forward and reverse directions is disposed in the switchback path SH4. A third gate GT3 as an example of a transport-direction switching member is disposed at an inlet of the switchback path SH4.

The transport path SH at the downstream side of the switchback path SH4 merges with the transport path SH for each of the feed trays TR1 and TR2.

In the interface module U4, the transport path SH extends toward the output unit U3.

In the output unit U3, a stacker tray TRh as an example of a container on which output recording sheets S are stacked is disposed, and an output path SH5 diverging from the transport path SH extends toward the stacker tray TRh. The transport path SH in the first exemplary embodiment is configured such that, when an additional output unit (not shown) or an additional post-processing unit (not shown) is attached to the right side of the output unit U3, the transport path SH is capable of transporting the recording sheet S to the added unit.

Operation of Marking Unit

When the printer U receives image information transmitted from the personal computer PC via the print image server COM, the printer U commences a job, which is an image forming operation. When the job commences, the photoconductor drums Py to Po, the intermediate transfer belt B, and the like rotate.

The photoconductor drums Py to Po are rotationally driven by a drive source (not shown).

The chargers CCy to CCo receive a predetermined voltage so as to charge the surfaces of the photoconductor drums Py to Po.

The exposure units ROSy to ROSo output laser beams Ly, Lm, Lc, Lk, and Lo as an example of latent-image write-in light in accordance with a control signal from the controller C1 so as to write electrostatic latent images onto the charged surfaces of the photoconductor drums Py to Po.

The developing units Gy to Go develop the electrostatic latent images on the surfaces of the photoconductor drums Py to Po into visible images.

The toner cartridges Ky to Ko supply the developers as the developers are consumed in the developing process performed in the developing units Gy to Go.

The first-transfer rollers T1y to T1o receive a first-transfer voltage with a reversed polarity relative to the charge polarity of the developers so as to transfer the visible images on the surfaces of the photoconductor drums Py to Po onto the surface of the intermediate transfer belt B.

The photoconductor cleaners CLy to CLo clean the surfaces of the photoconductor drums Py to Po after the first-transfer process by removing residual developers therefrom.

When the intermediate transfer belt B passes through first-transfer regions facing the photoconductor drums Py to Po, O, Y, M, C, and K images are transferred and superposed on the intermediate transfer belt B in that order, and the intermediate transfer belt B subsequently travels through a second-transfer region facing the second-transfer unit T2. When a monochrome image is to be formed, an image of a single color is transferred onto the intermediate transfer belt B and is transported to the second-transfer region.

In accordance with the size of the received image information, the designated type of recording sheets S, and the sizes and types of accommodated recording sheets S, one of the pickup rollers Rp feeds recording sheets S from the corresponding one of the feed trays TR1 to TR4 from which the recording sheets S are to be fed.

The corresponding separating roller Rs separates the recording sheets S fed by the pickup roller Rp in a one-by-one fashion.

The deburring unit Bt deburrs each recording sheet S passing therethrough by applying a predetermined pressure thereto.

The multi-feed detector Jk detects the thickness of recording sheet or sheets S passing therethrough so as to detect whether or not multiple sheets S are fed.

The correcting rollers Rc correct a skew of each recording sheet S passing therethrough by bringing the recording sheet S into contact with a wall surface (not shown).

The registration roller Rr feeds the recording sheet S in accordance with a timing at which the image on the surface of the intermediate transfer belt B is transported to the second-transfer region.

In the second-transfer unit T2, a predetermined second-transfer voltage having the same polarity as the charge polarity of the developers is applied to the backup roller T2a via the contact roller T2c so that the image on the intermediate transfer belt B is transferred onto the recording sheet S.

The belt cleaner CLB cleans the surface of the intermediate transfer belt B after the image transfer process performed at the second-transfer region by removing residual developers therefrom.

After the image is transferred onto the recording sheet S by the second-transfer unit T2, the transport belts T2e and HB transport the recording sheet S downstream while supporting the recording sheet S on the surfaces thereof.

The fixing device F includes a heating roller Fh as an example of a heating member and a pressing roller Fp as an example of a pressing member. The heating roller Fh accommodates therein a heater as an example of a heat source. The fixing device F heats and presses the recording sheet S passing through a region where the heating roller Fh and the pressing roller Fp are in contact with each other so as to fix an unfixed image onto the surface of the recording sheet S.

The cooling device Co cools the recording sheet S heated by the fixing device F.

The decurler Hd applies pressure to the recording sheet S having passed through the cooling device Co so as to decurl the recording sheet S, that is, to remove bending therefrom.

The image reading device Sc reads the image from the surface of the recording sheet S having passed through the decurler Hd.

In the case of duplex printing, the recording sheet S having passed through the decurler Hd is transported to the inversion path SH2 due to activation of the first gate GT1 and is switched back in the switchback path SH4 so as to be transported again to the registration roller Rr via the transport path SH, whereby printing is performed on the second face of the recording sheet S.

The recording sheet S to be output to the stacker tray TRh as an example of an output section is transported along the transport path SH so as to be output onto the stacker tray TRh. In this case, if the recording sheet S to be output to the stacker tray TRh is in an inverted state, the recording sheet S is temporarily transported to the inversion path SH2 from the transport path SH. After the trailing edge of the recording sheet S in the transport direction thereof passes through the second gate GT2, the second gate GT2 is switched and the switchback rollers Rb are rotated in the reverse direction so that the recording sheet S is transported along the connection path SH3 toward the stacker tray TRh.

When multiple recording sheets S are stacked on the stacker tray TRh, a stacker plate TRh1 automatically moves upward or downward in accordance with the number of stacked recording sheets S so that the uppermost sheet is disposed at a predetermined height.

Image Reading Device According to First Exemplary Embodiment

Figure 3A:
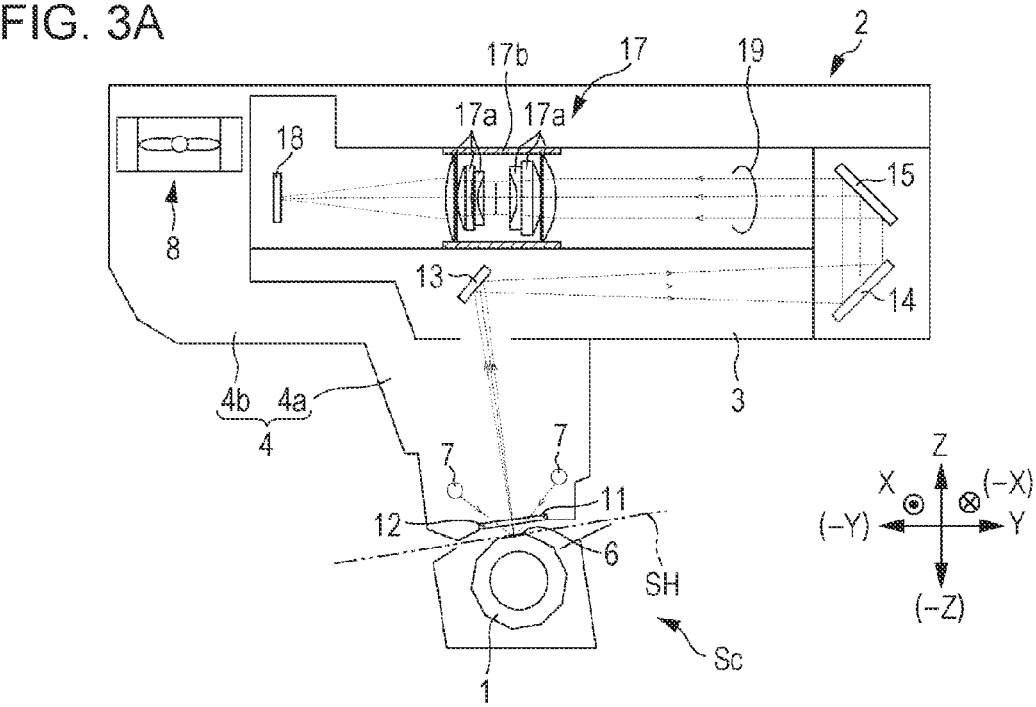
FIGS. 3A and 3B illustrate an image reading device according to the first exemplary embodiment, FIG. 3A being an enlarged view of a relevant part of the image reading device, FIG. 3B being an enlarged view of a relevant part of a read position.
Figure 3B:
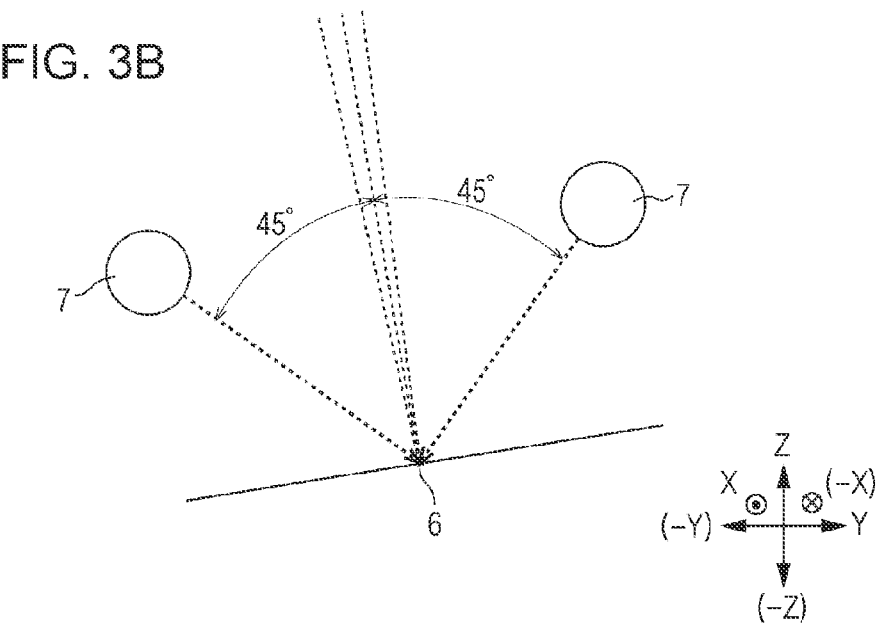

FIGS. 3A and 3B illustrate the image reading device according to the first exemplary embodiment. Specifically, FIG. 3A is an enlarged view of a relevant part of the image reading device, and FIG. 3B is an enlarged view of a relevant part of a read position.

Referring to FIGS. 3A and 3B, the image reading device Sc according to the first exemplary embodiment has a reference roller 1 as an example of a transport member that comes into contact with the lower surface of each recording sheet S transported along the transport path SH so as to transport the recording sheet S downstream. A body 2 of the image reading device Sc is disposed above the reference roller 1 with the transport path SH interposed therebetween. The body 2 includes a box-shaped optical-system accommodation section 3 located at an upper portion of the body 2 and extending in the transport direction and the widthwise direction of the recording sheet S, and a radiating-system accommodation section 4 disposed below and to the left of the optical-system accommodation section 3.

Lamps 7 as an example of light sources extending in the front-rear direction, which is the widthwise direction of the recording sheet S, are disposed in the radiating-system accommodation section 4. In the first exemplary embodiment, two lamps 7 are provided, each of which is disposed at a position that forms a 45° angle with the direction of the normal to the surface of the recording sheet S relative to a predetermined read position 6 on the transport path. The lamps 7 according to the first exemplary embodiment are formed of, but not limited to, white light emitting diodes (LEDs). Alternatively, light sources that output light having a continuous intensity in the wavelength band of visible light may be used. For example, tungsten lamps may be used.

Furthermore, a fan 8 as an example of a cooling member for cooling the lamps 7 is supported in the radiating-system accommodation section 4.

Figure 4A:
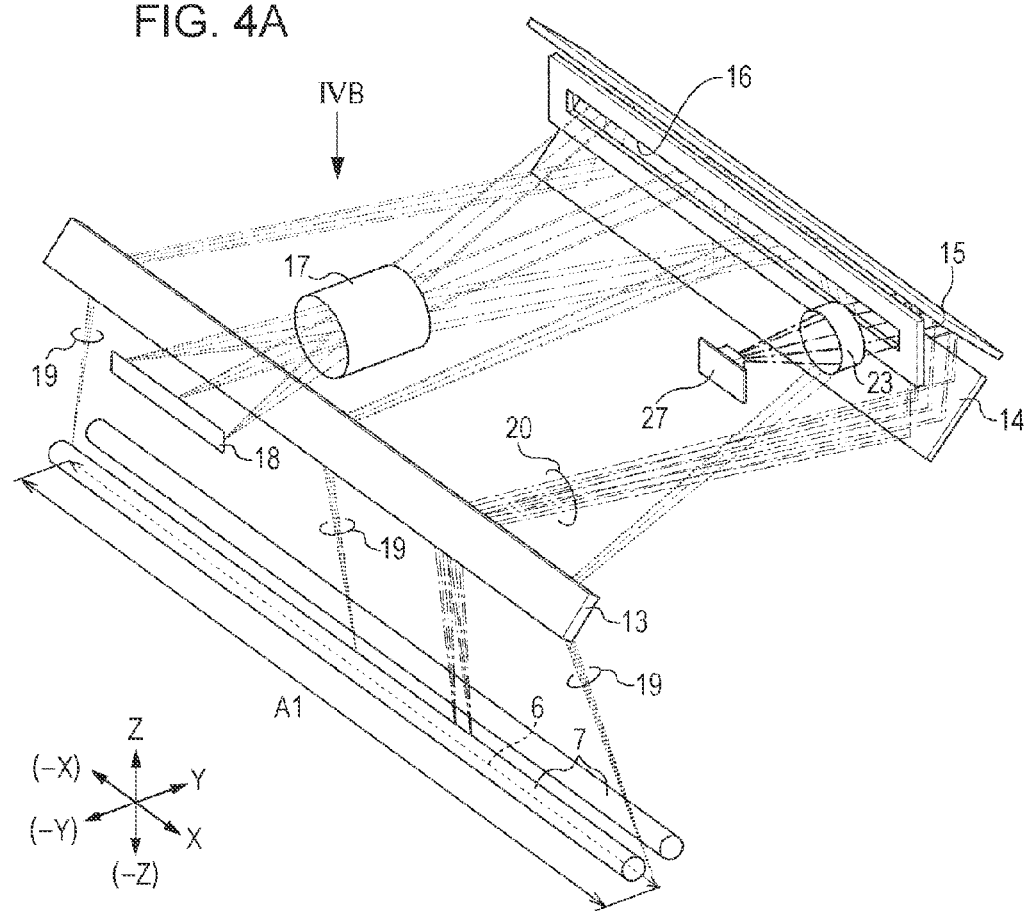
FIGS. 4A and 4B illustrate first and second reader systems in the image reading device according to the first exemplary embodiment, FIG. 4A illustrating a relevant part thereof, FIG. 4B being a diagram as viewed in a direction indicated by an arrow IVB in FIG. 4A.
Figure 4B:
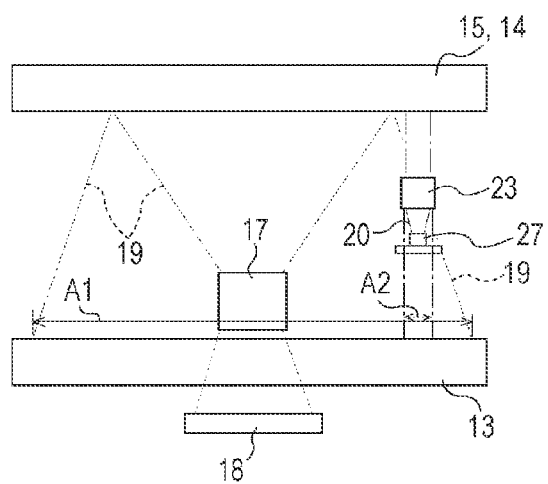

FIGS. 4A and 4B illustrate first and second reader systems in the image reading device according to the first exemplary embodiment. Specifically, FIG. 4A illustrates a relevant part of the systems, and FIG. 4B is a diagram as viewed in a direction indicated by an arrow IVB in FIG. 4A.

Figure 5:
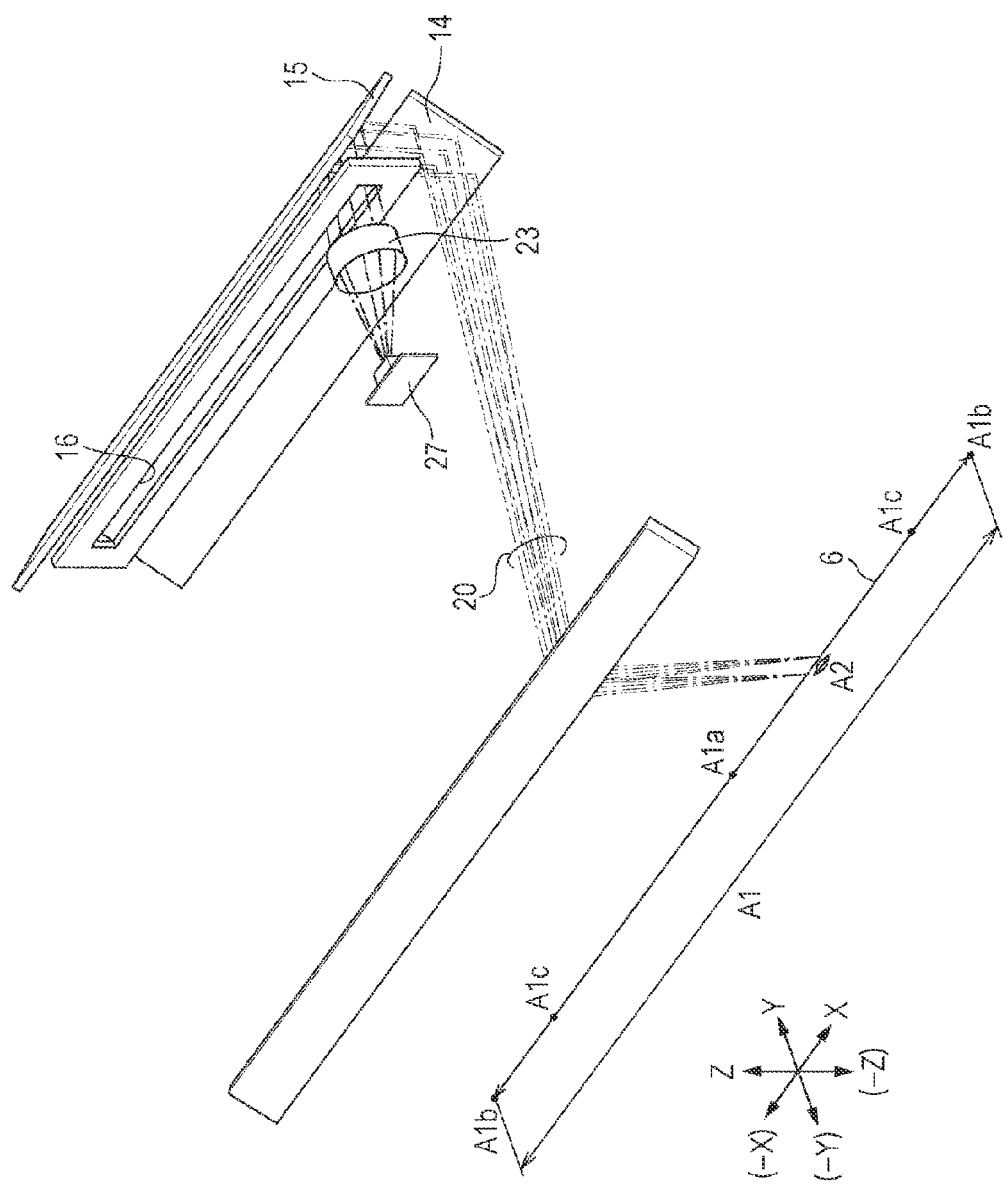
FIG. 5 illustrates the second reader system in the image reading device according to the first exemplary embodiment.

FIG. 5 illustrates the second reader system in the image reading device according to the first exemplary embodiment.

Referring to FIGS. 3A to 5, the radiating-system accommodation section 4 is provided with an opening 11 located above the read position 6 and extending in the front-rear direction. The opening 11 supports a transparent window member 12 that is capable of transmitting therethrough reflection light from the recording sheet S.

In the optical-system accommodation section 3, a first plane-shaped mirror 13 as an example of a first optical member that extends in the front-rear direction and reflects the light from the read position 6 rightward is supported above the window member 12. A second plane-shaped mirror 14 as an example of a second optical member that extends in the front-rear direction and reflects the light from the first mirror 13 upward is supported at the right side of the first mirror 13. A third plane-shaped mirror 15 as an example of a third optical member that extends in the front-rear direction and reflects the light from the second mirror 14 leftward is supported above the second mirror 14. The mirrors 13, 14, and 15 constitute an optical system 13+14+15 according to the first exemplary embodiment.

Referring to FIGS. 3A to 4B, a first imaging unit 17 as an example of a first imaging system that is disposed to the left of the third mirror 15 and that is located in a central area in the front-rear direction is supported via an aperture 16 that blocks ambient light, diffused reflection light, and the like. The first imaging unit 17 has a first imaging lens 17a as an example of a first imaging member that focuses the light from the third mirror 15 so as to form an image thereof. The first imaging lens 17a is accommodated inside a hood 17b as an example of a light blocking member that reduces the quantity of ambient light entering the first imaging lens 17a.

An image capturing element 18 as an example of a first reader member that receives light so as to read an image of the read position 6 is disposed at the left side of the first imaging unit 17. Although a charge-coupled device (CCD) image sensor is used as the image capturing element 18 in the first exemplary embodiment, a freely-chosen image capturing member that is capable of capturing an image used for detecting an image position, discoloration, an image defect, or the like may be used as an alternative.

At positions where the mirrors 13 to 15 according to the first exemplary embodiment are disposed, the light is not collimated. The first imaging lens 17a focuses light 19 that has reached the first imaging lens 17a from the third mirror 15 onto the image capturing element 18 so as to project the read position 6 onto the image capturing element 18. Accordingly, the image capturing element 18 according to the first exemplary embodiment is configured to read an image of a predetermined first read area A1 as an example of a read area, which is substantially the entire widthwise area of the recording sheet S passing through the read position 6.

Figure 6A:
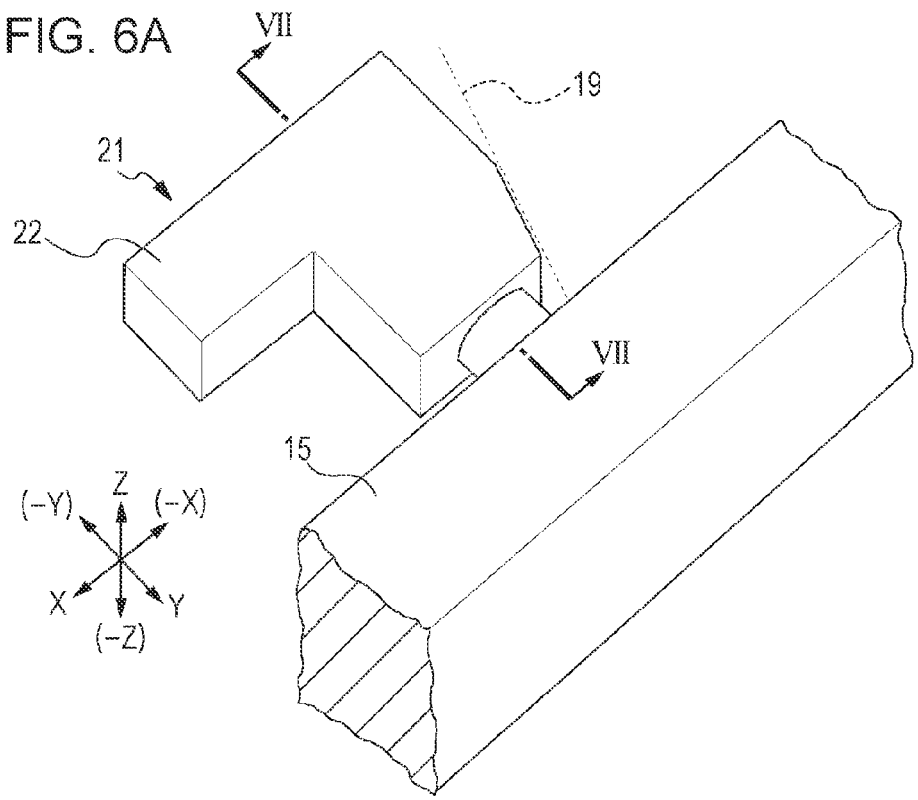
FIGS. 6A and 6B illustrate a relevant part of a second reader member according to the first exemplary embodiment, FIG. 6A being an external view thereof, FIG. 6B being a partial cross-sectional view thereof.
Figure 6B:
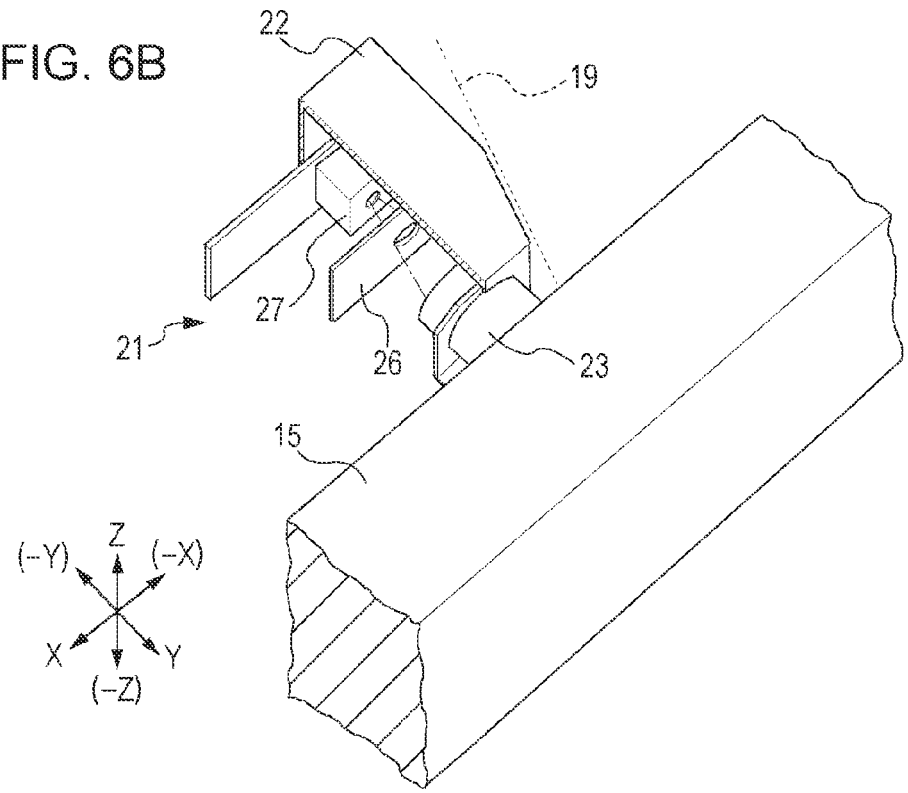

FIGS. 6A and 6B illustrate a relevant part of a second reader member according to the first exemplary embodiment. Specifically, FIG. 6A is an external view of the second reader member, and FIG. 6B is a partial cross-sectional view thereof.

Figure 7:
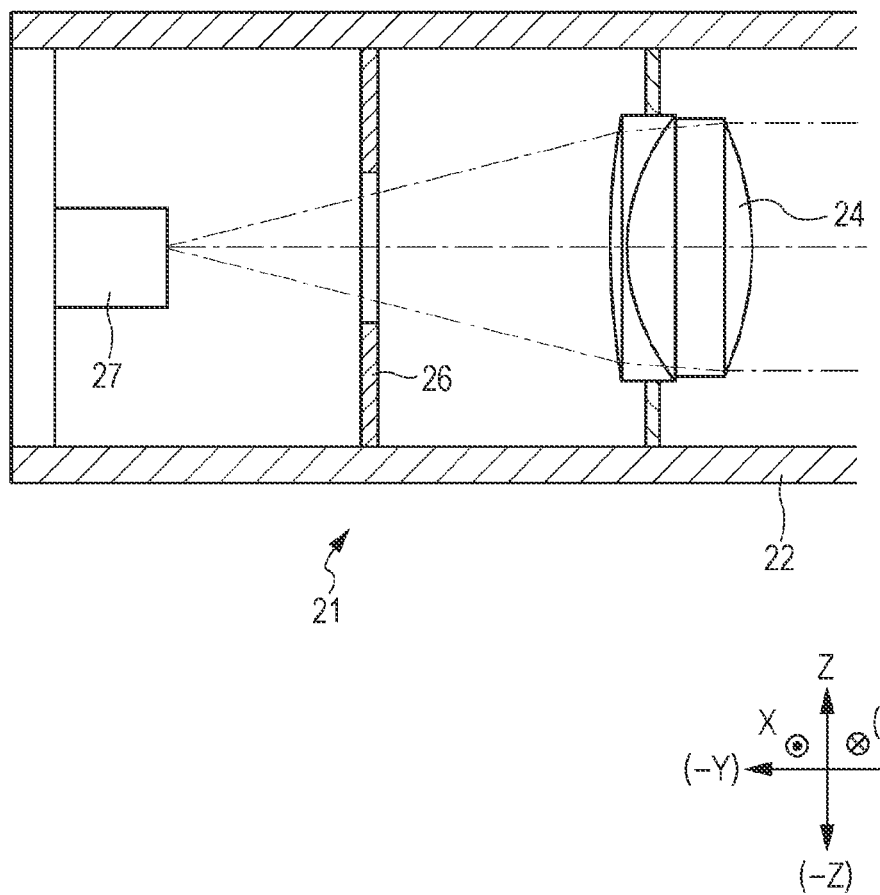
FIG. 7 is a cross-sectional view taken along line VII-VII in FIG. 6A.

FIG. 7 is a cross-sectional view taken along line VII-VII in FIG. 6A.

Referring to FIGS. 3A and 3B and FIGS. 5 to 7, a color measurement unit 21 as an example of a second reader system is disposed to the left of the third mirror 15 as well as at the right and front sides of the first imaging lens 17a.

Referring to FIGS. 5 to 7, the color measurement unit 21 has a cover 22 as an example of a light blocking member. Referring to FIGS. 6A and 6B, the cover 22 is disposed at a position outside an optical path of the light 19 entering the first imaging lens 17a. Moreover, the cover 22 has a certain shape and is disposed at a certain position such that the cover 22 does not adversely affect the image captured by the image capturing element 18. Specifically, as shown in FIG. 4B, the color measurement unit 21 according to the first exemplary embodiment is disposed outside the optical path of the light 19 read by the image capturing element 18, and the length of an optical path of light 20 measured by the color measurement unit 21 is shorter than that of the light 19 read by the image capturing element 18. Furthermore, as shown in FIG. 4B, in the color measurement unit 21 according to the first exemplary embodiment, a color measurement sensor 27 is disposed inward of the first read area A1 and the third mirror 15 in the longitudinal direction thereof, that is, rearward of positions corresponding to front ends of the first read area A1 and the third mirror 15.

Referring to FIGS. 6A to 7, a hood 23 as an example of a light blocking member is supported within the cover 22, and a second imaging lens 24 as an example of a second imaging member that focuses the light from the third mirror 15 so as to form an image thereof is supported within the hood 23. An aperture 26 as an example of a light blocking member is supported at the left side of the second imaging lens 24, and the color measurement sensor 27 as an example of a second reader member is supported at the left side of the aperture 26. Therefore, the second imaging lens 24 and the color measurement sensor 27 are surrounded by the hood 23.

The color measurement sensor 27 according to the first exemplary embodiment includes therein a spectroscope (not shown) and a detector that detects spectral light, and reads the colors in the image of the read position 6. Various known types of color-measuring devices and colorimeters may be used as the color measurement sensor 27. Specifically, known color-measuring devices, such as a sensor that uses a spectro-component, such as a grating or a prism, to separate the light and measure the colors thereof, or a sensor that uses a band-pass filter to separate a visible wavelength band into about six to eight bands so as to measure the colors thereof, may be used. In other words, the color measurement sensor 27 according to the first exemplary embodiment may be a high-performance color-measuring device specialized for color measurement and having higher wavelength-resolution and color-separation capabilities and higher color measurement accuracy, as compared with a known CCD sensor having a color separation filter for three colors, i.e., RGB.

Referring to FIG. 5, assuming that the distance from a widthwise center A1a of the recording sheet S to an outer widthwise end A1b is defined as 100%, the color measurement sensor 27 according to the first exemplary embodiment reads an image of a predetermined second read area A2 included in the first read area A1 and located inward of a position corresponding to 70% or smaller, that is, a 70%-position A1c. Therefore, in the first exemplary embodiment, the longitudinal direction of the first read area A1 to be read by the image capturing element 18 and the longitudinal direction of the second read area A2 are aligned with each other.

Referring to FIG. 3B, an optical axis of the color measurement sensor 27 according to the first exemplary embodiment is set within 10° relative to the normal to the measurement surface of the recording sheet S. Because an incident angle of light radiated onto the recording sheet S is substantially set to 45°, a regularly reflected component from the radiated light may be prevented from entering the color measurement sensor 27 by setting the tilt angle of the optical axis of the color measurement sensor 27 within 10°, thereby improving the color measurement accuracy.

Characteristics of Image Capturing Element and Color Measurement Sensor

Figure 8A:
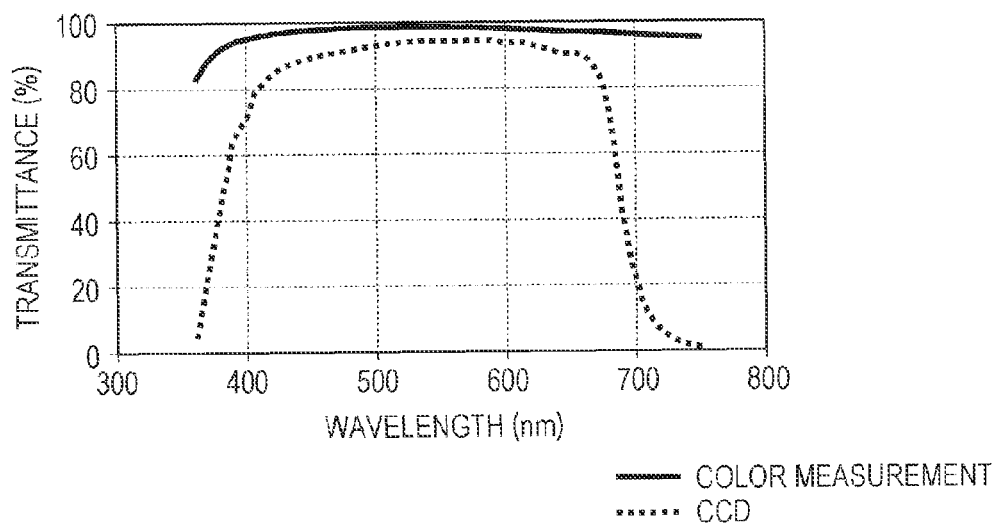
FIGS. 8A and 8B illustrate the characteristics of the two reader members used in the first exemplary embodiment, FIG. 8A being a spectral characteristic graph in which the horizontal axis denotes wavelength and the vertical axis denotes transmittance, FIG. 8B being an optical-system resolution graph in which the horizontal axis denotes spatial frequency and the vertical axis denotes modulation transfer function (MTF)
Figure 8B:
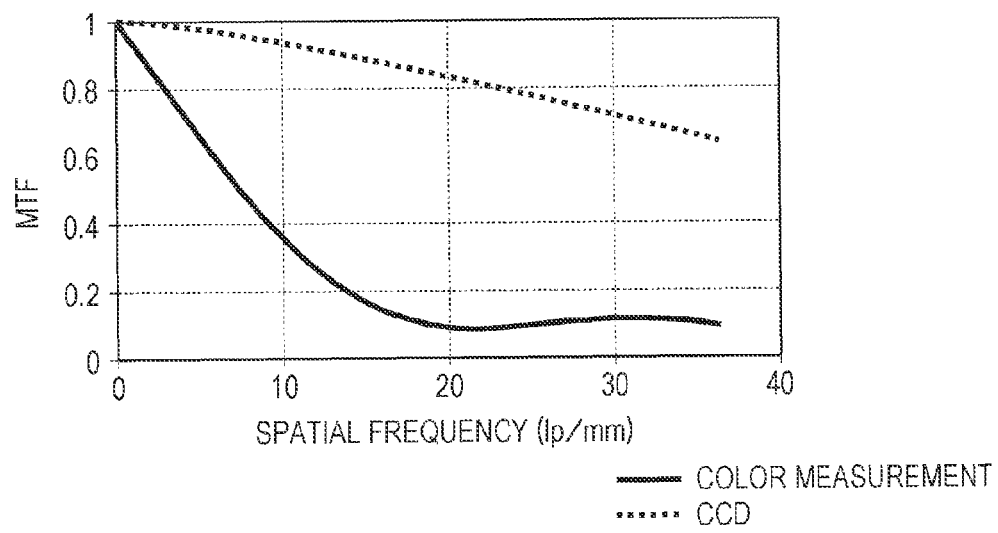

FIGS. 8A and 8B illustrate the characteristics of the two reader members used in the first exemplary embodiment. Specifically, FIG. 8A is a spectral characteristic graph in which the horizontal axis denotes wavelength and the vertical axis denotes transmittance, and FIG. 8B is an optical-system resolution graph in which the horizontal axis denotes spatial frequency and the vertical axis denotes modulation transfer function (MTF).

In FIGS. 8A and 8B, a dashed line denotes the characteristic of an image-capturing optical system 12+13+14+15+17+18, and a solid line denotes the characteristic of a color-measurement optical system 12+13+14+15+24+27. As shown in FIGS. 8A and 8B, the color-measurement optical system 12+13+14+15+24+27 has high transmittance over a wide wavelength band as compared with the image-capturing optical system 12+13+14+15+17+18, and tends to have a low demand with respect to MTF. In other words, the color-measurement optical system 12+13+14+15+24+27 has a high capability for color measurement, namely, for wavelength measurement of light, whereas the image-capturing optical system 12+13+14+15+17+18 has a low demand with respect to spectral transmittance but has high resolution so as to be capable of measuring an image position and the like with high accuracy.

Read Chart

FIG. 9 illustrates a chart image used for adjustment in the image forming apparatus according to the first exemplary embodiment.

Referring to FIG. 9, a read chart 31 as an example of an image read by the image reading device Sc according to the first exemplary embodiment has multiple strip-shaped areas 31a extending in the widthwise direction of the recording sheet S and arranged in the transport direction. The strip-shaped areas 31a are formed as an example of predetermined color-correction images with different colors and densities. In the first exemplary embodiment, in a case where a predetermined adjustment process commences when an input is received via the operable unit UI or a predetermined number of sheets are to be printed, the marking unit U1a is set to form the read chart 31 on the recording sheet S, and the read chart 31 is simultaneously read by the image capturing element 18 and the color measurement sensor 27. Specifically, in the first exemplary embodiment, the read chart 31 functions as a first image for image-quality determination to be read by the image capturing element 18 as well as a second image for color determination to be read by the color measurement sensor 27.

Operation of Image Reading Device According to First Exemplary Embodiment

In the image reading device Sc according to the first exemplary embodiment having the above-described configuration, when the adjustment process commences, the marking unit U1a generates the read chart 31, and the read chart 31 is transferred and fixed onto a recording sheet S. After the recording sheet S is cooled, the recording sheet S passes through the read position 6. When passing through the read position 6, light radiated from the lamps 7 is reflected by the read chart 31 and is measured by the image capturing element 18 and the color measurement sensor 27 via the optical system 13+14+15+17+24.

Based on the image measured by the image capturing element 18, the controller C1 determines whether there is misregistration in the image on the surface of the recording sheet S, discoloration in the widthwise direction, or an image defect such as a white spot or streak. Then, in a subsequent printing process and onward, the controller C1 performs processes, such as adjusting the rotational speed of the photoconductor drums Py to Po and the transport speed of the recording sheet S in accordance with the misregistration, adjusting the output from the exposure units ROSy to ROSo in the widthwise direction in accordance with the discoloration, and displaying a message prompting the user to check or replace the components in accordance with the image detect. Furthermore, based on the measurement result of the color measurement sensor 27, the controller C1 determines whether there is color misregistration between the colors in the printed image and the measured colors. Based on the color misregistration, the controller C1 performs a color adjustment process by adjusting the output from the exposure units ROSy to ROSo between the respective colors and the voltages applied to the chargers CCy to CCo and the developing units Gy to Go.

Therefore, in the image reading device Sc according to the first exemplary embodiment, the image capturing element 18 and the color measurement sensor 27 are capable of performing two different kinds of reading processes, i.e., an image capturing process and a color measurement process, with respect to an image by sharing the optical system 13+14+15, thereby allowing for a compact configuration, as compared with a configuration provided with an additional optical system.

In particular, in the first exemplary embodiment, since the lamps 7 serving as light sources are shared between the image capturing process and the color measurement process, size reduction and energy efficiency may both be achieved.

Furthermore, in the first exemplary embodiment, since the first read area A1 to be measured by the image capturing element 18 and the second read area A2 to be measured by the color measurement sensor 27 share the same longitudinal direction, the read area of the recording sheet S in the moving direction thereof may be reduced, as compared with a case where the two areas have different longitudinal directions. Accordingly, the lamps 7 and the mirrors 13 to 15 may be reduced in size, thereby achieving size reduction of the image reading device Sc. Moreover, at the outer longitudinal edges of the printer U, the image forming capability generally tends to become unstable as compared with the central area thereof, possibly resulting in reduced accuracy of the image characteristics to be measured. In contrast, in the first exemplary embodiment, the second read area A2 is disposed inward of the 70%-position in the X-axis direction of the recording sheet S, so that the color measurement accuracy may be improved, as compared with a case where the second read area A2 is disposed toward an outer edge.

Furthermore, in the first exemplary embodiment, the color measurement sensor 27 is disposed within the width of the first read area A1 in the longitudinal direction, as shown in FIG. 4B. Therefore, as viewed in the longitudinal direction, the color measurement sensor 27 is disposed in an area that is not used for reading by the image capturing element 18, that is, an area where the third mirror 15 is disposed but acting as a dead space. Consequently, in the image reading device Sc according to the first exemplary embodiment, the dead space is efficiently utilized, thereby reducing the space in the longitudinal direction, as compared with a case where the image capturing element 18 and the color measurement sensor 27 are separately disposed. Thus, in the longitudinal direction, at least a portion of the color measurement sensor 27 may be disposed at a position inward of the first read area A1, that is, a position that overlaps the third mirror 15. As in the first exemplary embodiment, the entire color measurement sensor 27 may be disposed inward of the first read area A1.

Furthermore, in the first exemplary embodiment, the second imaging lens 24 of the color measurement sensor 27 is provided separately from the first imaging lens 17a used by the image capturing element 18, so that the color measurement sensor 27 and the image capturing element 18 may be positionally displaced relative to each other. Consequently, the degree of freedom in terms of design is improved.

In particular, the color measurement sensor 27 is disposed closer toward the third mirror 15 relative to the image capturing element 18, and has a short optical path for the light 20. In general, if a certain light quantity is to be ensured as the optical path increases in length, a lens with a large aperture is used, possibly resulting in an increase in size of the second imaging lens 24. In contrast, in the first exemplary embodiment, the optical path of the light 20 entering the color measurement sensor 27 is short so that an increase in size of the second imaging lens 24 may be suppressed, thereby achieving size reduction and cost reduction.

Furthermore, in the first exemplary embodiment, the tilt angle of the second imaging lens 24 relative to the normal to the surface of the recording sheet S is set within 10° so that regularly reflected light from the lamps 7 may be prevented from entering the second imaging lens 24, thereby allowing for highly accurate color measurement.

Furthermore, in the first exemplary embodiment, the read chart 31 printed on the recording sheet S by the marking unit U1a is read by the image capturing element 18 and the color measurement sensor 27. Specifically, unlike a case where the colors, discoloration, and the like are determined by capturing visible images developed on the surfaces of the photoconductor drums Py to Po or visible images transferred onto the surface of the intermediate transfer belt B, an image printed on the recording sheet S that is to be actually viewed by the user is read in the first exemplary embodiment. Therefore, the measurement process is performed on the basis of an image that is closer to reality, as compared with the case where the images on the surfaces of the photoconductor drums Py to Po and the like are read, thereby reducing a difference between the adjustment result and the printed result.

Furthermore, in the first exemplary embodiment, the image quality, such as an image position, discoloration in the widthwise direction, and an image defect, and the colors can be simultaneously measured and determined based on a single read chart 31. Thus, the measurement and adjustment processes may be performed within a shorter period of time, as compared with a case where the image quality and the colors are individually measured, thereby allowing for an increase in overall speed.

Furthermore, in the first exemplary embodiment, the light blocking members 17b, 22, 23, and 26 are disposed such that an adverse effect of ambient light on the imaging lens 17a and 24 may be reduced. In particular, the color measurement sensor 27 is surrounded by the hood 23 so that a reduction in the color measurement accuracy may be suppressed.

Modifications

Although the exemplary embodiment of the present invention has been described in detail above, the present invention is not to be limited to the above exemplary embodiment and permits various modifications within the technical scope of the invention defined in the claims. Modifications H01 to H012 will be described below.

In a first modification H01, the image forming apparatus according to the above exemplary embodiment is not limited to the printer U, but may be, for example, a copier, a facsimile device, or a multifunction apparatus having multiple or all functions of such devices.

In the above exemplary embodiment, the printer U is configured to use developers of five colors. Alternatively, in a second modification H02, the above exemplary embodiment may be applied to, for example, a monochrome image forming apparatus or a multicolor image forming apparatus that uses four colors or fewer, or six colors or more.

In the above exemplary embodiment, the optical system 13+14+15 is constituted of three mirrors. Alternatively, in a third modification H03, the number of mirrors may be arbitrarily changed to, for example, two or fewer, or four or more. Furthermore, for example, the number of optical members provided toward the image capturing element 18 and the number of optical members provided toward the color measurement sensor 27 may be changed, such as disposing an additional mirror only between the third mirror 15 and the first imaging unit 17. Furthermore, although plane-shaped reflecting mirrors are described as an example of optical members, the optical members may be alternative reflecting mirrors, such as cylindrical mirrors, spherical mirrors, or parabolic mirrors, or transmissive lenses, such as focusing lenses, in accordance with the shape and the width of the optical path.

Although the second read area A2 is disposed inward of the 70%-position in the widthwise direction in the above exemplary embodiment, the second read area A2 may alternatively be disposed outside the 70%-position in a fourth modification H04.

Although the longitudinal direction of the first read area A1 and the longitudinal direction of the second read area A2 are aligned with each other in the above exemplary embodiment, the longitudinal directions thereof may alternatively intersect at, for example, 90° in a fifth modification H05.

Although the lamps 7 are shared light sources in the above exemplary embodiment, a light source optimized for the image capturing element 18 and a light source optimized for the color measurement sensor 27 may be provided separately from each other in a sixth modification H06. Furthermore, the number of lamps 7 is not limited to two, and may alternatively be one, or three or more. Moreover, the installation angle of each lamp 7 may alternatively be set to an angle other than 45°.

In the above exemplary embodiment, the color measurement sensor 27 is disposed outside the optical path of the light 19 measured by the image capturing element 18. Alternatively, in a seventh modification H07, for example, a beam splitter may be disposed between an imaging lens and the image capturing element 18 so that beams are distributed to the image capturing element 18 and the color measurement sensor 27, thereby performing the measurement processes using a single imaging lens. In other words, the imaging lens may also be shared between the image capturing process and the color measurement process.

In the above exemplary embodiment, the color measurement unit 21 is disposed close to the third mirror 15 so as to shorten the optical path. Alternatively, in an eighth modification H08, the color measurement unit 21 may be disposed at the same position as the image capturing element 18 or at a position farther away from the third mirror 15 than the image capturing element 18.

In the above exemplary embodiment, the cover 22, the hoods 17b and 23, the aperture 26, and the like are provided as light blocking members. Alternatively, in a ninth modification H09, these components may be omitted so as to allow for a reduced number of components.

In the above exemplary embodiment, the tilt angle of the color measurement unit 21 relative to the normal to the recording sheet S is set within 10°. Alternatively, in a tenth modification H010, the color measurement unit 21 may be disposed at a position where it forms an angle greater than or equal to 10°.

In the above exemplary embodiment, the read chart 31 is detected simultaneously by both the image capturing element 18 and the color measurement sensor 27. Alternatively, in an eleventh modification H011, a first image to be used for measurement by the image capturing element 18 and a second image to be used for measurement by the color measurement sensor 27 may be printed on separate recording sheets S so as to individually perform the measurement processes.

In the above exemplary embodiment, the image reading device Sc is disposed at a position where a recording sheet S having undergone a fixing process, a cooling process, and a decurling process can be read so that an image that is to be actually viewed by the user can be read. Alternatively, in a twelfth modification H012, the image reading device Sc may be disposed at a freely-chosen position, such as a position immediately downstream of the fixing device F or a position immediately in front of the inversion path or the stacker tray TRh, if allowed by the demanded image quality or the specifications. Instead of disposing the image reading device Sc in the transport path SH, it may also be possible to have the image reading device Sc built inside a document image reader, i.e., a so-called image scanner. In that case, a recording sheet S having undergone a printing process and output onto the stacker tray TRh may be set on the image scanner so as to be read by the image reading device Sc.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
a first reader member that reads an image recorded on a surface of a medium traveling through a read area by receiving light from the medium, the read area being set on a transport path along which the medium is transported and the read area has a first side perpendicular to a transport direction;
an optical system that guides the light from the medium to the first reader member; and
a second reader member having a color measurement unit that is disposed in an optical path of the light guided by the optical system and that performs color measurement on the light, the second reader member reading a color of the image recorded on the surface of the medium on the basis of the light, the second reader member reading the color of the image in a second area included in the read area read by the first reader member and the second area has a second side perpendicular to the transport direction, the second side shorter than the first side.

2. The image reading device according to claim 1, wherein the color measurement unit has a higher wavelength resolution than the first reader member.

3. The image reading device according to claim 1, wherein, assuming that a distance from (i) a center of the medium in a widthwise direction intersecting a transport direction of the medium to (ii) an outer end of the medium in the widthwise direction is defined as 100%, the second area read by the second reader member is set at a position corresponding to 70% or smaller of the distance from the center of the medium.

4. The image reading device according to claim 1, wherein a longitudinal direction of the read area and a longitudinal direction of the second area are aligned with each other.

5. The image reading device according to claim 1, further comprising a light source that radiates light toward the medium traveling through the read area and that is disposed in correspondence with the read area on the transport path along which the medium having the image recorded on the surface thereof is transported, the light source being a shared light source that radiates light to be read by the first reader member and the second reader member.

6. The image reading device according to claim 1, wherein the second reader member is disposed outside an optical path of the light read by the first reader member.

7. The image reading device according to claim 1, wherein the second reader member is disposed inward of an outer end of the read area read by the first reader member.

8. The image reading device according to claim 1, further comprising:
- a first imaging member that is disposed on the optical path of the optical system and that focuses light onto the first reader member so as to form an image of the light thereon; and
- a second imaging member that is disposed on the optical path of the optical system and that is located at a position displaced relative to the first imaging member, the second imaging member focusing light onto the second reader member so as to form an image of the light thereon.

9. The image reading device according to claim 8, wherein the second imaging member is disposed at a position where an optical path extending from the second area to the second imaging member is shorter than an optical path extending from the read area to the first imaging member.

10. The image reading device according to claim 1, wherein the first reader member reads a first image, of the image, used for image-quality determination, and
wherein the second reader member reads a second image, of the image, used for color determination.

11. The image reading device according to claim 1, wherein an optical axis of the second reader member is tilted at an angle that is smaller than or equal to 10° relative to the normal to the surface of the medium.

12. The image reading device according to claim 1, further comprising a light blocking member that is disposed so as to surround the second reader member and that blocks light at the first reader member side.

13. An image forming apparatus comprising:
- an image recorder that records an image onto a medium; and
- the image reading device according to claim 1 that reads the image recorded by the image recorder.

* * * * *